US007007179B2

(12) United States Patent
Mares et al.

(10) Patent No.: US 7,007,179 B2
(45) Date of Patent: Feb. 28, 2006

(54) ELECTRIC LOAD MANAGEMENT CENTER

(75) Inventors: Mircea Mares, Mississauga (CA); Zhenning Liu, Mississauga (CA)

(73) Assignee: Honeywell International Inc., Morris Township, NJ (US)

( * ) Notice: Subject to any disclaimer, the term of this patent is extended or adjusted under 35 U.S.C. 154(b) by 465 days.

(21) Appl. No.: 10/299,388

(22) Filed: Nov. 19, 2002

(65) Prior Publication Data

US 2003/0095367 A1    May 22, 2003

Related U.S. Application Data

(63) Continuation-in-part of application No. 10/017,125, filed on Dec. 14, 2001.

(60) Provisional application No. 60/267,520, filed on Feb. 8, 2001, provisional application No. 60/381,067, filed on May 16, 2002.

(51) Int. Cl.
  *G06F 1/26* (2006.01)
  *G06F 1/28* (2006.01)
  *G06F 1/30* (2006.01)
  *H02J 1/00* (2006.01)

(52) U.S. Cl. ............... 713/310; 713/300; 713/340; 307/43

(58) Field of Classification Search ............... None
See application file for complete search history.

(56) References Cited

U.S. PATENT DOCUMENTS

| 3,842,249 A | 10/1974 | Geyer et al. |
| 4,403,292 A | 9/1983 | Ejzak et al. |
| 4,419,588 A | 12/1983 | Goiset |
| 4,633,392 A | 12/1986 | Vincent et al. |
| 4,638,175 A | 1/1987 | Bradford et al. |
| 4,645,148 A | 2/1987 | Kolkman |
| 4,811,136 A | 3/1989 | Jones et al. |
| RE33,087 E | 10/1989 | Bradford et al. |
| 4,918,589 A | 4/1990 | Floro et al. |
| 4,967,097 A | 10/1990 | Mehl |
| 5,065,314 A | 11/1991 | Maskovyak |
| 5,266,793 A * | 11/1993 | Smith ............... 250/214 A |
| 5,274,767 A | 12/1993 | Maskovyak |
| 5,339,262 A * | 8/1994 | Rostoker et al. ............... 716/4 |
| 5,422,517 A | 6/1995 | Verney et al. |
| 5,448,492 A | 9/1995 | Kolomyski et al. |

(Continued)

FOREIGN PATENT DOCUMENTS

CA    776249    1/1968

(Continued)

*Primary Examiner*—Lynne H. Browne
*Assistant Examiner*—James K. Trujillo
(74) *Attorney, Agent, or Firm*—Birch, Stewart, Kolasch & Birch, LLP

(57) ABSTRACT

An electrical power distribution system is disclosed that includes a gateway module (100) including logic (112) to interface to a vehicle management computer (VMC) (50) via a dual redundant standard data bus (1). The gateway module (100) has redundant microcontrollers (114, 116) operably connected to the VMC (50) for selectively controlling supply of electrical power to a plurality of separate electrical loads (120). A plurality of Load Management Modules (300) is provided. Each Load Management Module (300) includes a local microcontroller (310); power switching devices (320); and application specific integrated circuits ASICs (330) for interfacing the power switching devices (320) to the local microcontroller (310). Each ASIC (330) can be connected to a corresponding digital potentiometer (600) that is used to program an over current protection characteristic. Additionally, each ASIC (330) can include a voltage to frequency converter (381) that provides a true RMS current value to the local microcontroller (310).

10 Claims, 10 Drawing Sheets

U.S. PATENT DOCUMENTS

| | | |
|---|---|---|
| 5,466,974 A | 11/1995 | Sutrina et al. |
| 5,488,532 A | 1/1996 | Mrowiec et al. |
| 5,497,322 A | 3/1996 | Kolomyski et al. |
| 5,504,655 A | 4/1996 | Underwood et al. |
| 5,515,282 A | 5/1996 | Jackson |
| 5,567,993 A | 10/1996 | Jones et al. |
| 5,581,229 A | 12/1996 | Hunt |
| 5,594,285 A | 1/1997 | Wisbey et al. |
| 5,604,385 A | 2/1997 | David |
| 5,612,579 A | 3/1997 | Wisbey et al. |
| 5,615,105 A | 3/1997 | Tofigh et al. |
| 5,666,256 A | 9/1997 | Zavis et al. |
| 5,696,695 A | 12/1997 | Ehlers et al. |
| 5,723,915 A | 3/1998 | Maher et al. |
| 5,752,047 A | 5/1998 | Darty et al. |
| 5,754,445 A | 5/1998 | Jouper et al. |
| 5,764,502 A | 6/1998 | Morgan et al. |
| 5,818,673 A | 10/1998 | Matsumaru et al. |
| 5,884,233 A | 3/1999 | Brown |
| 5,889,775 A | 3/1999 | Sawicz et al. |
| 5,892,449 A | 4/1999 | Reid et al. |
| 5,914,542 A | 6/1999 | Weimer et al. |
| 5,915,128 A | 6/1999 | Bauman et al. |
| 5,936,318 A | 8/1999 | Weiler et al. |
| 5,973,409 A | 10/1999 | Neibecker et al. |
| 5,977,645 A | 11/1999 | Glennon |
| 5,982,156 A | 11/1999 | Weimer et al. |
| 6,018,203 A | 1/2000 | David et al. |
| 6,046,513 A | 4/2000 | Jouper et al. |
| 6,055,144 A | 4/2000 | Reid |
| 6,133,846 A | 10/2000 | Birkedahl et al. |
| 6,141,710 A | 10/2000 | Miesterfeld |
| 6,150,734 A | 11/2000 | Neibecker et al. |
| 6,195,243 B1 | 2/2001 | Spencer et al. |
| 6,208,107 B1 | 3/2001 | Maske et al. |
| 6,208,914 B1 | 3/2001 | Ward et al. |
| 6,208,955 B1 | 3/2001 | Provan et al. |
| 6,212,049 B1 | 4/2001 | Spencer et al. |
| 6,222,714 B1 | 4/2001 | Hoffman |
| 6,242,873 B1 | 6/2001 | Drozdz et al. |
| 6,344,700 B1 | 2/2002 | Eisenhauer et al. |
| 6,735,709 B1 * | 5/2004 | Lee et al. .................. 713/401 |
| 2001/0028241 A1 | 10/2001 | Saito et al. |

FOREIGN PATENT DOCUMENTS

| | | |
|---|---|---|
| CA | 990793 | 6/1976 |
| CA | 2018831 | 12/1991 |
| CA | 2117549 | 10/1999 |
| DE | 19918995 A1 | 11/2000 |
| EP | 0982641 A2 | 3/2000 |
| EP | 1 055 547 A1 | 11/2000 |
| EP | 1055547 A1 | 11/2000 |

* cited by examiner

ELECTRIC LOAD MANAGEMENT CENTER

RELATED APPLICATION

This application claims priority under 35 U.S.C. §119(e) of U.S. Provisional Application No. 60/381,067 filed on May 16, 2002 and under 35 U.S.C. §120 as a continuation-in-part of application Ser. No. 10/017,125 filed on Dec. 14, 2001, which claims the benefit of U.S. Provisional Application No. 60/267,520 filed on Feb. 8, 2001, the entire contents of each application being herein incorporated by reference.

FIELD OF THE INVENTION

The present invention relates to power management and electric power distribution systems for applications having multiple separately controlled electrical loads.

BACKGROUND OF THE INVENTION

Electrical power controllers have been used for the distribution of electrical power on aircraft and other vehicles. Additionally, modular approaches to supply vehicle power have been used to facilitate both maintenance and operability under fault conditions.

New generation vehicles have significantly different electric power requirements. For example, in aerospace systems, there has been a fundamental paradigm shift from predominantly mechanical or electromechanical control to predominantly electronic and computer-based control, with no or minimal backup. This shift toward fly-by-wire systems has been pioneered in Europe by Airbus and now encompasses safety-critical systems.

This shift in technology poses fundamental technical and commercial challenges, which require advanced power distribution controllers such as an Electric Load management Center (ELMC). Advances in switching technology (solid state) and computer control now offer the potential for fully automated electric power systems (EPS). A combination of solid state power controllers (SSPC), remote power controllers, smart contactors, and automatic system processors has evolved into ELMC.

As computer-controlled system technology advances more system functions, including power control, fall under computer-controlled command. A more advanced technology in the power control and protection is making its way into aerospace power systems to replace mechanical circuit breakers and relays.

U.S. Pat. No. 5,752,047 issued to Darty et al. discloses a modular solid state power controller with microcontrollers. The modular solid state power controller includes low cost low speed microcomputers embedded within the load cards to control a number of semiconductor power switches associated with corresponding electrical load circuits. A master controller microcomputer on the controller card communicates bilaterally with each of the microcomputers embedded within the load cards via a serial data path that extends along the backplane card and interconnects the controller microcomputer with each of the load cards. Each of the load cards includes semiconductor power switches associated with the respective slave card, which are activated upon commands issued from the controller microcomputer.

However, the Darty et al. design utilizes discrete components to provide limited control of the power switches. Therefore, this modular solid state power controller with microcomputers is limited to basic on/off control of the power switches and does not permit local control functionality and flexible configuration of the SSPCs.

Therefore, it is desired to have an ELMC that includes integrated advanced power switch controllers that interface with the local microcontrollers and allow for additional control and configuration of each individual power switch.

SUMMARY OF THE INVENTION

In accordance with the present invention, the deficiencies in prior systems are overcome by providing an electrical power distribution center comprising: a gateway module including logic to interface to a vehicle management computer (VMC) via a dual redundant standard data bus, wherein the gateway module comprises redundant microcontrollers operably connected to the VMC for selectively controlling supply of electrical power to a plurality of separate electrical loads; two internal serial data buses, wherein the two internal serial data buses are of two different types and the redundant microcontrollers are each operably connected to the two internal serial data buses; and a plurality of Load Management Modules (LMMs), each Load Management Module operably connected to the internal serial data buses for receiving control commands from the gateway module, wherein each Load Management Module comprises: a local microcontroller; a plurality of power switching devices; and a plurality of application specific integrated circuits (ASICs) corresponding to the plurality of power switching devices for interfacing the power switching devices to the local microcontroller, wherein each ASIC is connected to a corresponding digital potentiometer that is used to program an over current protection characteristic of the ASIC.

Additionally, the present invention provides an electrical power distribution center comprising: a gateway module including logic to interface to a vehicle management computer (VMC) via a dual redundant standard data bus, wherein the gateway module comprises redundant microcontrollers operably connected to the VMC for selectively controlling supply of electrical power to a plurality of separate electrical loads; two internal serial data buses, wherein the two internal serial data buses are of two different types and the redundant microcontrollers are each operably connected to the two internal serial data buses; and a plurality of Load Management Modules (LMMs), each Load Management Module operably connected to the internal serial data buses for receiving control commands from the gateway module, wherein each Load Management Module comprises: a local microcontroller; a plurality of power switching devices; and a plurality of application specific integrated circuits (ASICs) corresponding to the plurality of power switching devices for interfacing the power switching devices to the local microcontroller, wherein each ASIC includes a voltage to frequency converter that converts a true RMS current value to a corresponding frequency that is provided to the local microcontroller.

Still further, the present invention provides an electrical power distribution center comprising: a gateway module including logic to interface to a vehicle management computer (VMC) via a dual redundant standard data bus, wherein the gateway module comprises redundant microcontrollers operably connected to the VMC for selectively controlling supply of electrical power to a plurality of separate electrical loads; two internal serial data buses. The two internal serial data buses are of two different types and the redundant microcontrollers are each operably connected to the two internal serial data buses. A plurality of Load Management Modules (LMMs) are provided. Each Load Management Module is operably connected to the internal serial data buses for receiving control commands from the gateway module. Each Load Management Module comprises: a local microcontroller; a plurality of power switching devices; and a plurality of application specific integrated circuits (ASICs) corresponding to the plurality of power switching devices for interfacing the power switching devices to the local microcontroller. Each ASIC includes a decoder for decoding a channel ID that determines which of the plurality of power switching devices will be activated. Further scope of applicability of the present invention will become apparent from the detailed description provided hereinafter.

BRIEF DESCRIPTION OF THE DRAWINGS

A more complete understanding of the present invention will become apparent from the following description taken in conjunction with the accompanying drawings, wherein.

DETAILED DESCRIPTION OF THE PREFERRED EMBODIMENTS

Figure 1A:
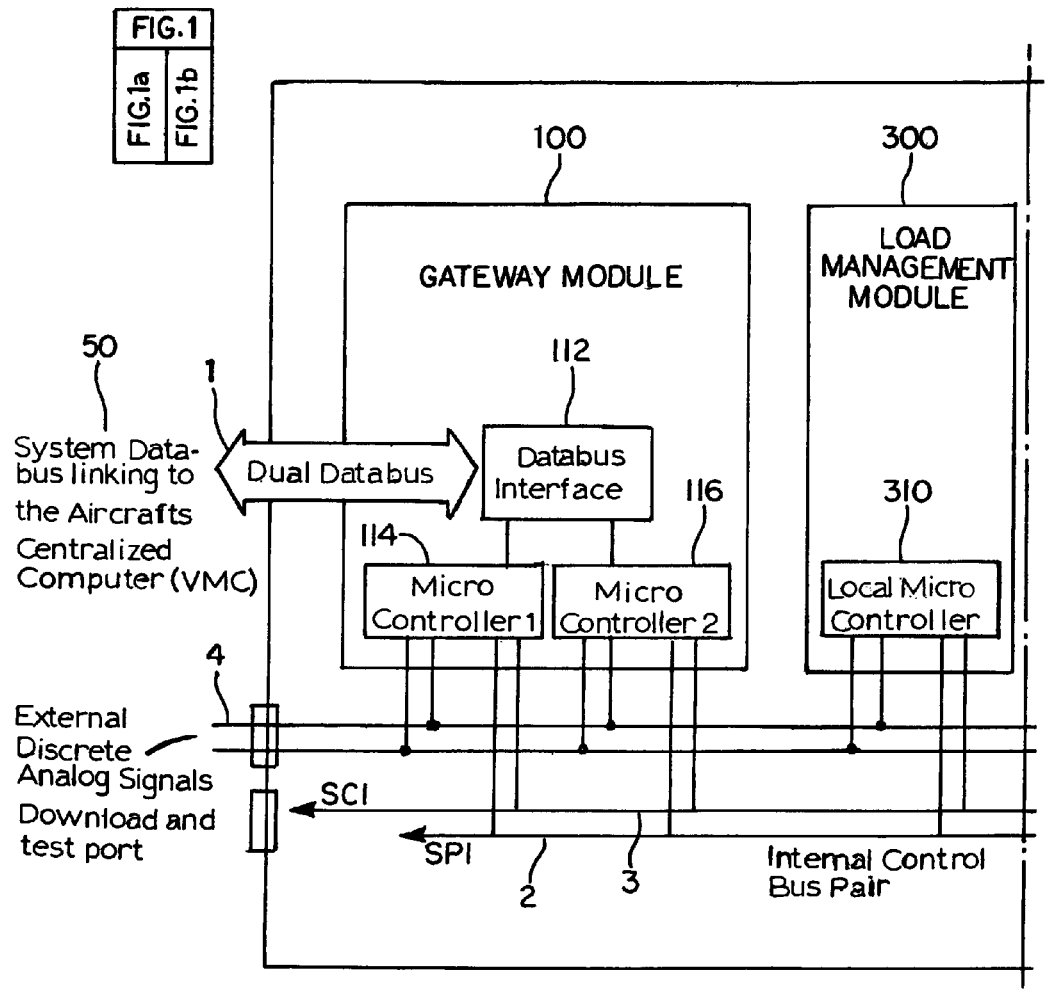
FIG. 1 comprising FIG. 1a and FIG. 1b illustrates a modular architecture in accordance with an aspect of the present invention.

Aspects of the invention are disclosed in the following description. Those skilled in the art will appreciate that alternate embodiments can be devised without departing from the spirit or the scope of the invention.

The Electrical Load Management Center (ELMC) is responsible for the distribution of electrical power to the vehicle. It also can supply control logic for some vehicle systems. Thus, the ELMC replaces complex relay logic and circuit cards that are part of the traditional subsystems control. Additionally, the ELMC can provide status information to an electrical power system display to provide a real time picture of the electrical power system configuration.

By reducing system complexity and increasing system functionality, the ELMC provides lower system weight, higher reliability, higher system availability, better maintainability and lower cost of ownership to the end user.

As mentioned above, modern vehicles have significantly different electric power requirements. These requirements include remote control/interfacing with vehicle management computers, increased reliability, fault tolerance (e.g., to cover for powered-by-wires or fly-by-wires implementations and features), increased electrical power demands and reduced direct maintenance cost (DMC).

The ELMC incorporates control, protection, and built-in test (BIT) functions for improved availability and maintainability. The ELMC can interface with a higher-level management computer for command control and status reporting. The power and control hardware are carefully designed for compatibility into current vehicle (e.g., aircraft) systems such that it provides the power flow and status data while optimizing size, weight, and efficiency constraints.

Additionally, the ELMC in accordance with the present inventions has various fault detection and isolation functions. The ELMC has the ability to test, monitor and report on system (e.g., electric power) health and to individually identify failed solid state switching devices (SSSDs)/power switching devices (PSDs) in specific LMMs to minimize maintenance efforts on the entire vehicle.

Another aspect of the present invention is the ELMC configured as a Line Replaceable Unit (LRU) used in the distribution of electrical power for airborne, seaborne, land or space vehicles. In this context, the term distribution includes but is not limited to the switching of power from various power buses within the ELMC, the protection of wiring downstream of the power switching devices, the reporting back of the status of the power switching devices, and provision of load management functions such as load shedding, sequencing of load switching, and the like.

The above-mentioned ELMC is built on a modular architecture concept for flexibility. The ELMC contains LMMs and other circuit cards to provide conditioned power supply, analog and digital signal conditioning and interfacing with the host vehicle through a gateway module and associated controller.

A LMM is a circuit card assembly that contains a plurality of solid state switching devices/power switching devices. The LMM is used to switch AC or DC power, protect the wiring from overcurrent conditions and distribute the power to utilization equipment. The LMM can replace hybrid solid state power controllers or the combination of relay and circuit breakers. The SSSD and LMM are modular in design itself so that each can be applied to many applications. A microcontroller, also located on the LMM, interfaces the SSSDs with the gateway module. Each SSSD includes a mixed technology Application Specific Integrated Circuit (ASIC) that controls switch drivers, monitoring and overcurrent protection functions, and the like. Each power switching device (PSD), installed on the LMM provides line power switching and is controlled by an ASIC.

Figure 1B:
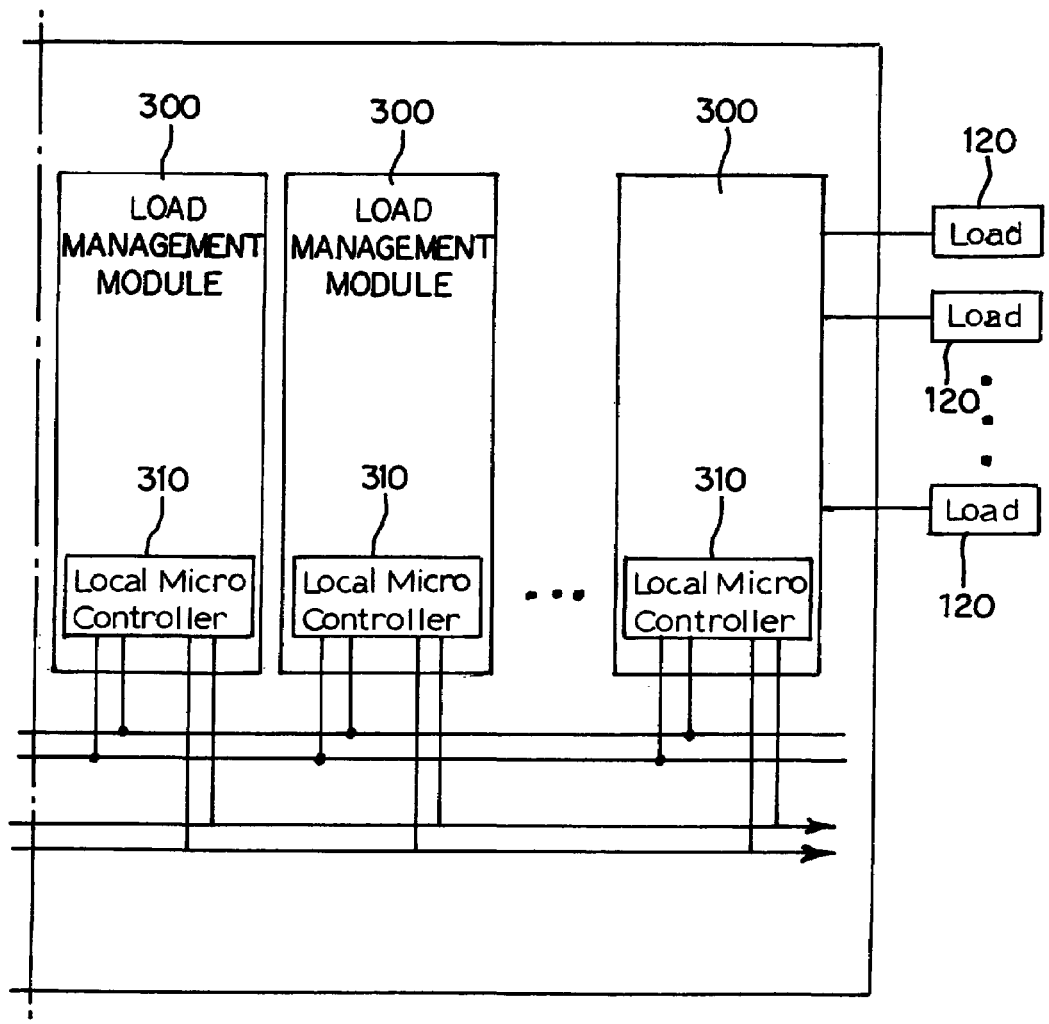

An exemplary embodiment of a modular architecture according to the present invention is shown in FIG. 1 comprising FIGS. 1A and 1B. A gateway module 100 including logic 112 to interface to a vehicle management computer (VMC) 50 via a dual redundant standard data bus 1. The term "logic" as used herein refers to any combination of hardware, software and or combinations of hardware and software to implement the associated function, as will be appreciated by those skilled in the art. The gateway module 100 comprises redundant microcontrollers 114, 116 operably connected to the VMC 50 for selectively controlling supply of electrical power to a plurality of separate electrical loads 120. The communication with the VMC 50 is implemented by any suitable serial communication such as ARINC 429, ARINC 629, MIL-STD-1 553, Avionics Full Duplex Switch Ethernet (AFDX), and the like. In the modular design of present invention, only the gateway module 100 is modified to accommodate a new communication protocol.

Within the ELMC, two types of serial data buses 2, 3 are used for intra-ELMC communication. The redundant microcontrollers 114, 116 are each operably connected to the two internal serial control buses 2, 3. In this example, the two internal serial data buses are Synchronous Serial Peripheral Interface (SPI) and Asynchronous Serial Communications Interface (SCI), which were chosen for dissimilarity purposes. The SPI is a high-speed communication, full-duplex, three-wire synchronous transfer bus. The SCI is a serial UART type asynchronous communication bus, full-duplex, single wire operation mode. As the ELMC motherboard is the critical common link between gateway module and LMMs, the two communication buses provide dual redundancy and reduce occurrence rate of a common mode failure. Dissimilar control and communication techniques are used in critical systems to reduce common mode failures. For example, an undetected software error (e.g., virus, bug and the like) will affect one system but not be replicated by or affect the other.

External discrete and analog input signals 4 can be fed to the gateway module 100 and LMMs 300 for subsystem control. A plurality of LMMs 300 including local microcontroller 310 is shown. Each Load Management Module 300 is operably connected to the internal serial data buses 2, 3 for receiving control commands via the gateway module 100.

Figure 2:
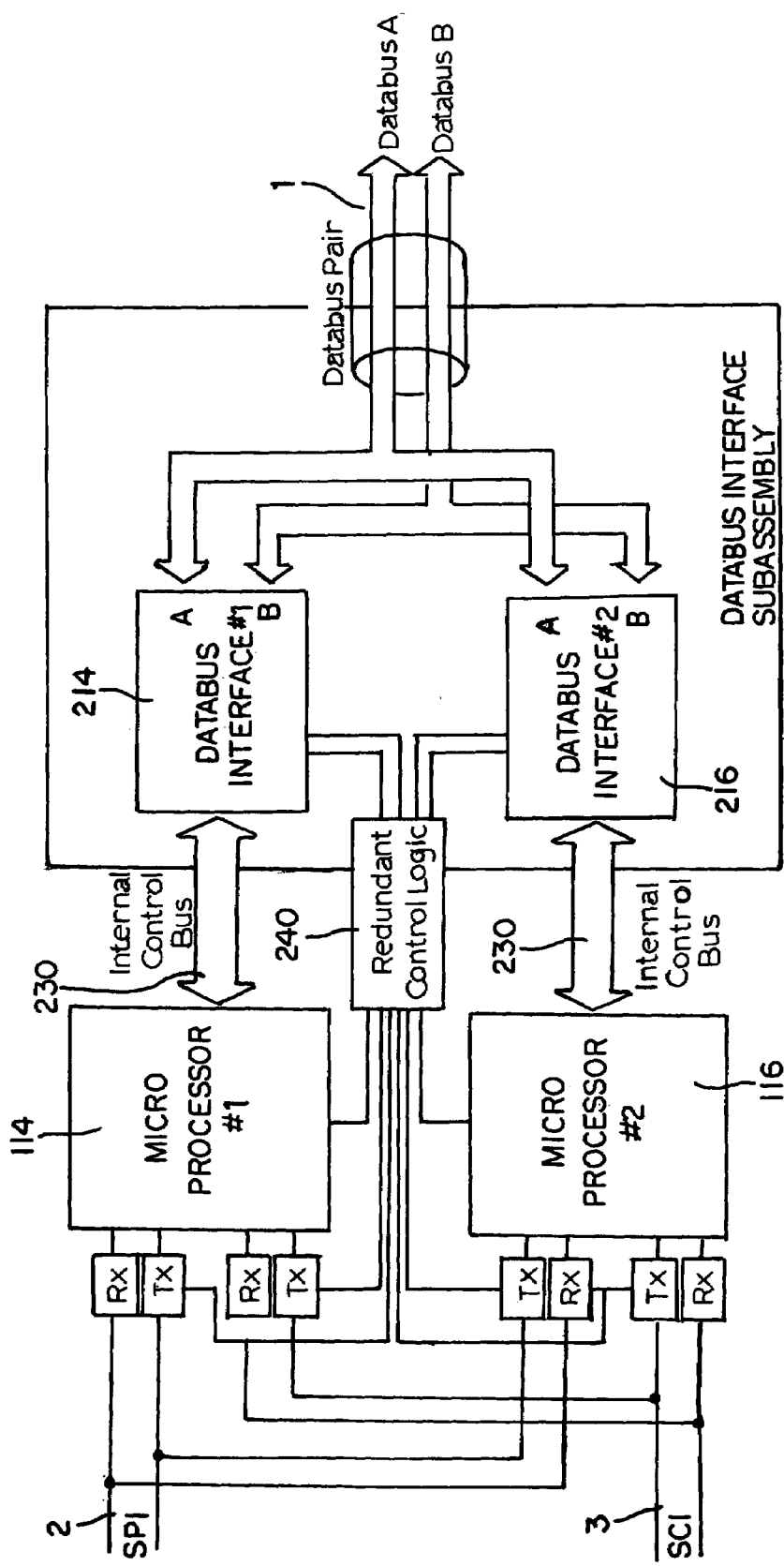
FIG. 2 illustrates a block diagram of the ELMC communication with the vehicle in accordance with an aspect of the present invention.

Referring to FIG. 2, a block diagram of the gateway module is shown. Critical components are replicated to achieve fault tolerance, such as the microcontroller having a dual-redundant channel. The gateway module 100 contains one low cost microcontroller 114, 116 per channel interfaced to the data bus remote terminal interfaces 214, 216, respectively. These communicate with microcontrollers 114, 116 via an internal control bus 230. Redundant control logic 240 provides supervisory control and decides which of the channels (both are simultaneously active) are in control at any particular time. Those skilled in the art will appreciate that the gateway module 100 is interconnected such that either microcontrollers 114, 116, can communicate with the VMC 50 via the redundant data bus 1 and the LMMs 300 using either of the internal serial data buses 2, 3. Thus, a failure of any one of these components does not prevent operation of the ELMC.

Figure 3A:
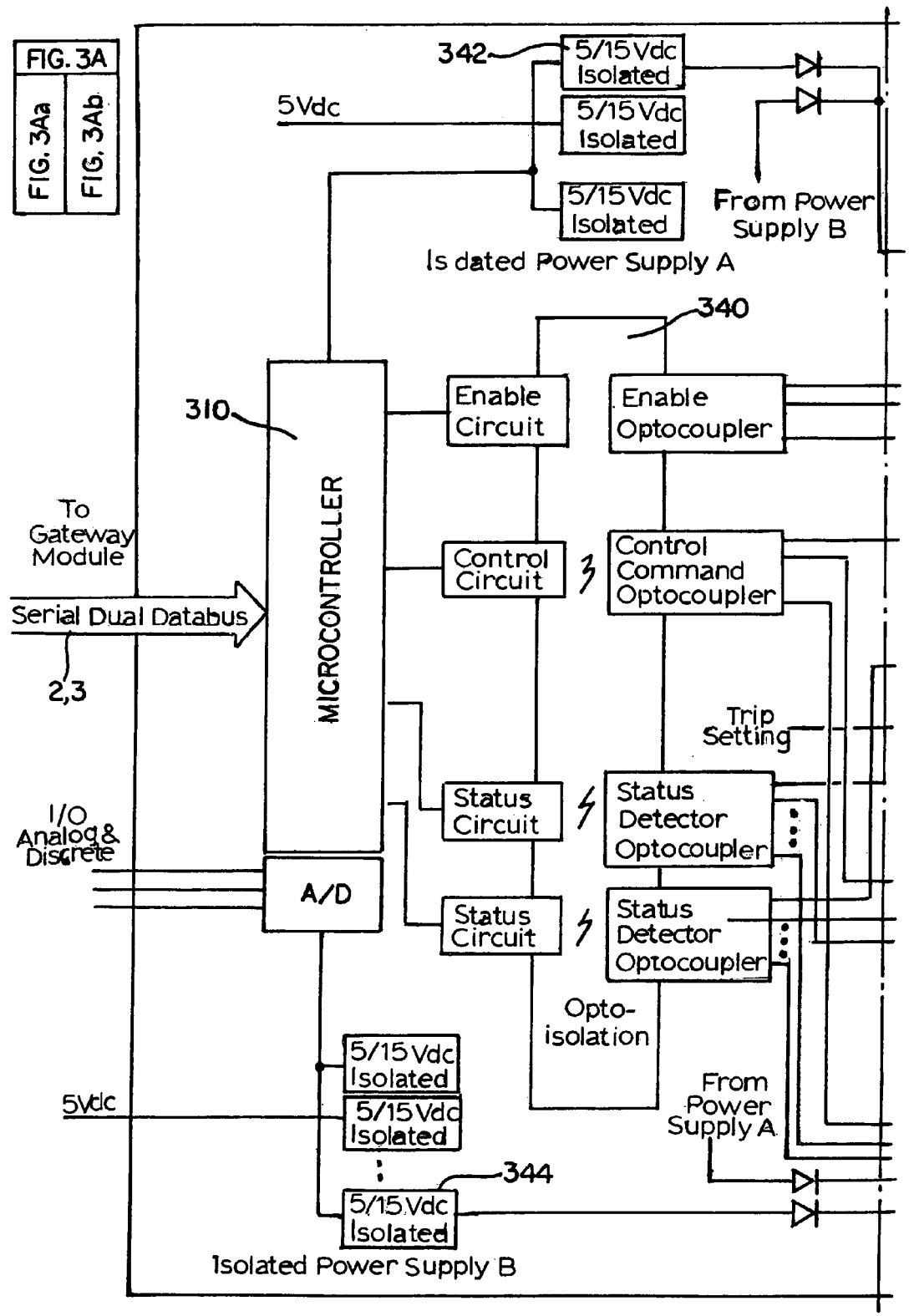
FIG. 3A comprising FIG. 3Aa and FIG. 3Ab illustrates a block diagram of a Load Management Module in accordance with an aspect of the present invention.
Figure 3A:
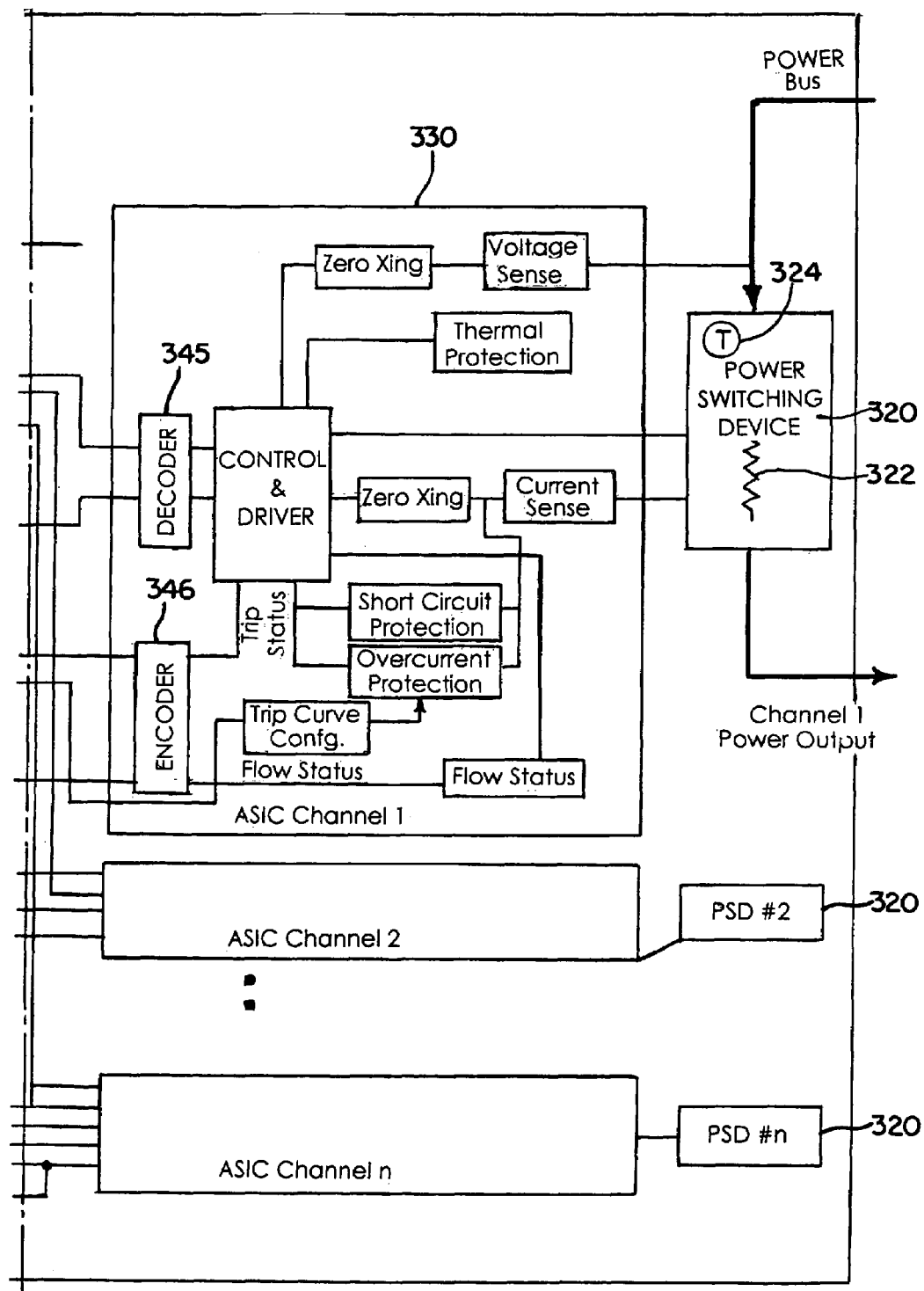

A block diagram of a Load Management Module 300 is shown in FIG. 3A comprising FIGS. 3Aa and 3Ab. Each Load Management Module includes a local microcontroller 310, a plurality of power switching devices 320, and a plurality of application specific integrated circuits (ASICs) 330 corresponding to the plurality of power switching devices for interfacing the power switching devices 320 to the local microcontroller 310.

The LMMs are packaged in a manner that minimizes cost and thermal dissipation when compared to conventional devices. At the LMM level, the local monitoring is based on channel tracing. One advantage of this approach is that the system behavior can be observed without intrusion. Those skilled in the art will appreciate that this approach requires additional software that observes application tasks during runtime and traces task states, discrete values, and the like.

Figure 3B:
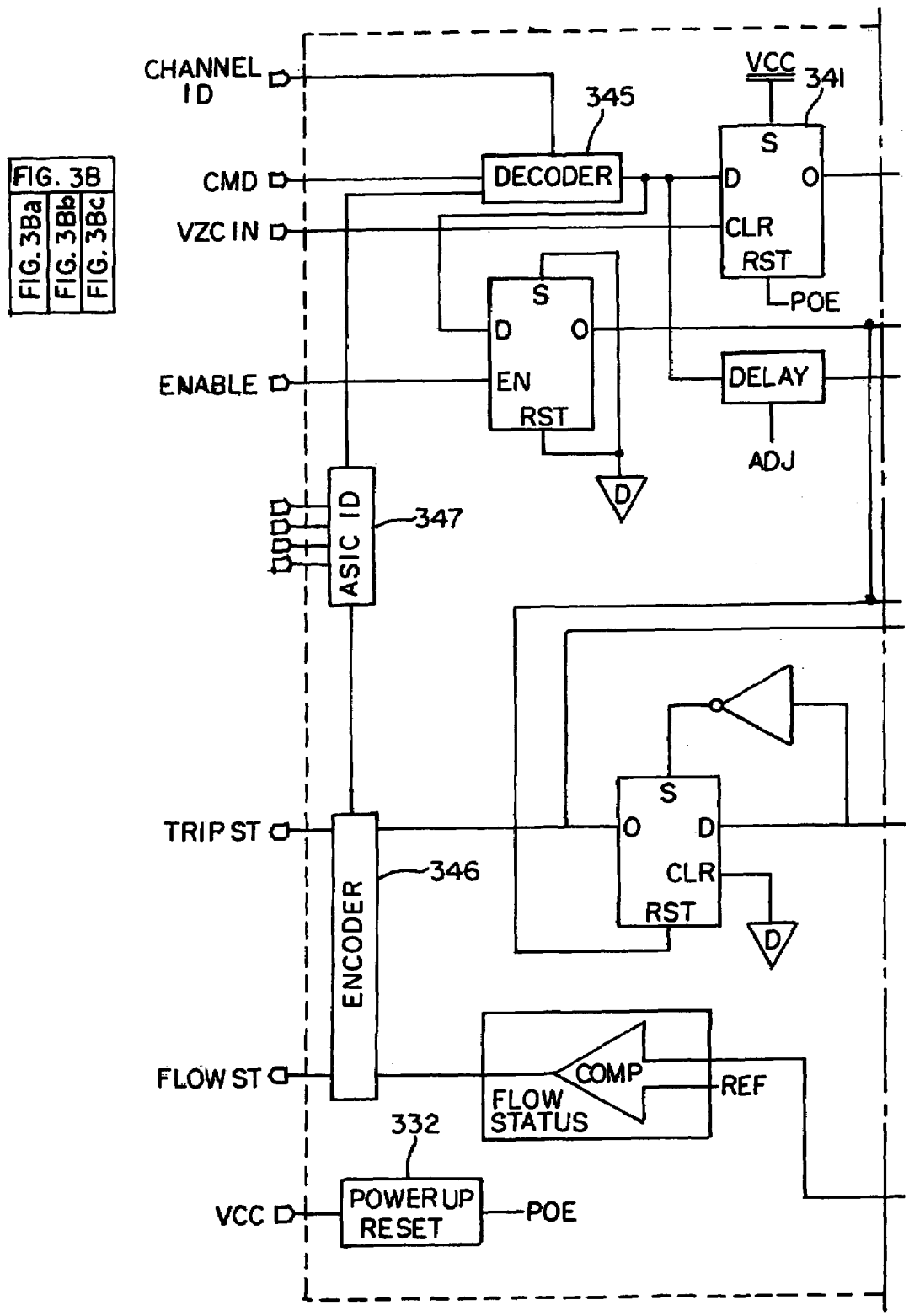
FIG. 3B comprising FIG. 3Ba, FIG. 3Bb and FIG. 3Bc illustrates a block diagram of logic in an application specific integrated circuit in accordance with an aspect of the present invention.
Figure 3B:
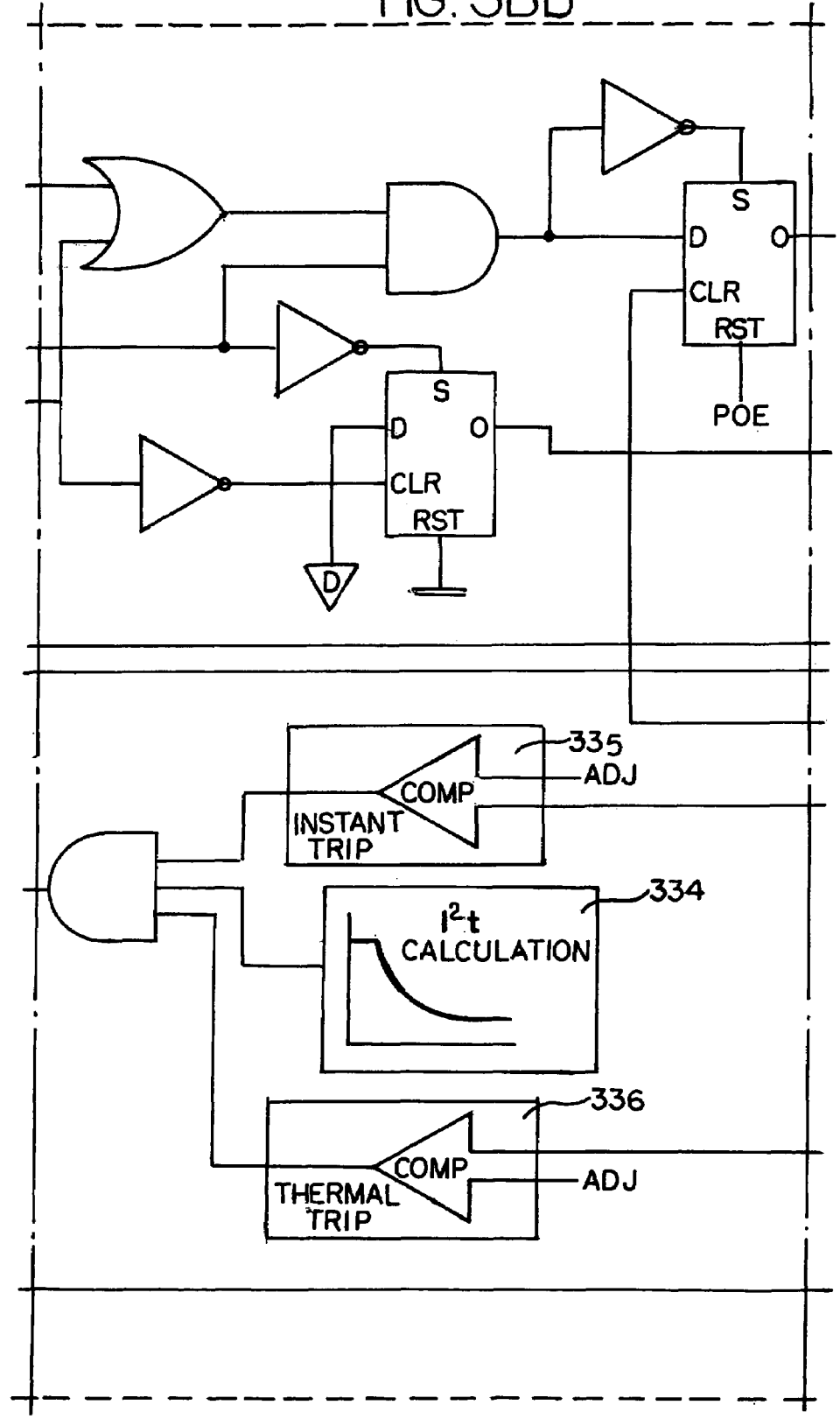
Figure 3B:
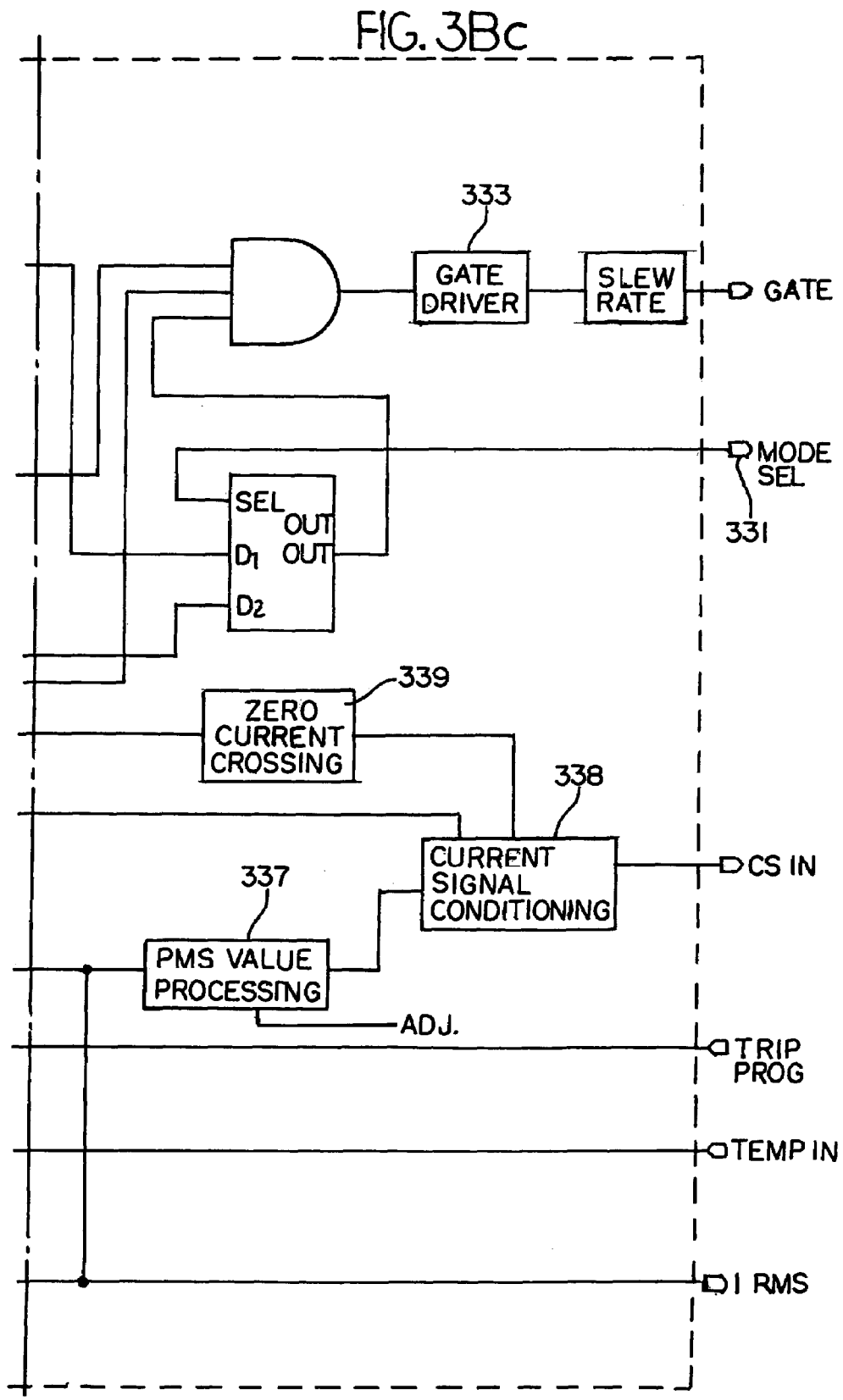

To achieve a higher level of integration, these features and associated circuits are incorporated in a mixed technology ASIC 330, as shown in FIG. 3B comprising FIGS. 3Ba, 3Bb and 3Bc. The ASIC 330 incorporates and packages load switching and protective functions. These functions are enabled by related "logic", which as noted above refers to any combination of hardware, software and or combinations of hardware and software to implement the associated function, as will be appreciated by those skilled in the art. It covers both AC and DC modes and applications with various current ratings. Mode selection is accomplished by connecting a mode select pin 331 to a corresponding logic level. For example, the default mode (not connected) is AC.

Power up reset logic 332 executes an internal reset and calibration cycle during a power-up sequence, to increase the accuracy over temperature and aging ranges. Examples of additional functions/circuits of the ASIC 330 include: gate driver 333 for providing a gating on of the PSD in response to a command signal; providing $I^2t$ characteristics 334; fast shut down (i.e., instant trip function) 335; providing real time status of the power switching device; and tailoring of power switching functions to control or limit the rate of change of the current during switching (e.g., soft turn on off for DC and zero voltage crossing turn on/zero crossing current turn off for AC).

Each ASIC 330 also includes an analog signal processing block 338 that conditions a load current sense voltage across the shunt resistor 322 to produce a true RMS current value via RMS value calculation logic 337. Those skilled in the art will appreciate that a true RMS current is not a trivial value to obtain, especially in switched power systems where the DC current is not pure DC current and the AC current is not purely sinusoidal containing only one frequency. However, the true RMS current is critical for calculating RMS heating and $I^2t$ values related to thermal limits of protected components and protected wiring. For example, each ASIC includes an analog processor 334 that uses the $I^2t$ value to control variable trip times (i.e., removing power from the down stream devices) under different application configurations (e.g. overcurrent for a calculated period of time based on $I^2t$ formula).

As described above, each ASIC includes zero-crossing current processing/detection 339 and zero-crossing voltage processing/detection 341. Zero-crossing voltage detection is done in a centralized location (e.g. power supply module). It represents a square waveform, in phase with the AC line voltage (so it follows the period and phase of the AC line voltage—constant or variable frequency). The zero-crossing current processing/detection 339 and zero-crossing voltage processing/detection 341 are used for controlling on/off activation and respective deactivation timing of the corresponding power switching device when operating in an AC mode. Those skilled in the art will appreciate that a soft-start function is used when operating in a DC mode. The soft start can be a simple ramp function, log function, S-function and the like as is well known in the art.

Further, unlike prior designs, the design of the ELMC allows individual ASICs 330 to be coordinated thereby allowing ganged operation. As illustrated in FIG. 3A, the LMM 310 has a plurality (e.g., eight as shown) of power switching devices 320 and corresponding ASICs 330. For example, three ASICs 330 can be gang operated in an AC mode to control a three-phase power source. Prior systems, such as the previously mentioned U.S. Pat. No. 5,752,047, have no practical way to control multi-phase loads in a coordinated manner. Those skilled in the art will appreciate software controls that allow for ASICs 330 to be gang operated will coordinate the operation of each ganged ASIC with the other ganged ASIC 330. For example, in ganged operation a command to activate one of PSDs controlled by one of the ganged ASICs will act to activate the other PSDs associated with the other ganged ASICs. Additionally, other related functions are coordinated in ganged operation (e.g., trip, status, and the like) are well known in the art and will not be detailed herein.

As shown in FIG. 3Ab, the local microcontroller 310 is isolated from the ASIC's 330 high voltage side driver and power lines using opto-couplers 340. Redundant power supplies, 342, 344 energize the individual ASIC channels and preserve isolation. The redundant power supplies 342, 344 are isolated low power DC to DC converters that supply power to the ASICs 330. DC to DC converters are well know in the art and will not be described further herein.

The opto-couplers 340 contain various individual couplers that provide an isolated communication bridge between the microcontroller 310 and ASICs 330. One of the signals passed from the microcontroller 310 to the ASICs 330 is a Channel ID signal, as shown in FIG. 3Ba, that is decoded by decoder 345 to enable the appropriate ASIC 330. Accordingly, each ASIC 330 has an associated Channel ID (e.g., 1–n), which corresponds to the PSD 320 controlled by the respective ASIC 330. Therefore, the Channel ID signal can be broadcast to all ASICs 330 along with the appropriate commands and only the desired PSD 320 will be activated. The address (channel ID), generated by the VMC 50, is compared with the wired location ID 347 of the ASIC 330 and when they match the information is passed inside the ASIC 330. For example, the VMC 50 transmits the address of a device and a command for that device to the appropriate ASIC 330 via the gateway module 100 and local microcontroller 310. The data from the VMC 50 is passed to the internal serial bus via the gateway module 100. The serial communication on the internal bus is received by the local microcontroller 310 and relayed internally to the ASICs 330, wherein each ASIC 330 compares the address (channel ID) associated with the information to its wired location ID 347. Upon a positive match of the address and wired location ID 347, the associated information is received by ASIC 330 for subsequent processing (e.g., activating PSD 320).

The same approach (using encoders 346 this time) can be used to report back to the microcontroller and VMC monitoring data. Those skilled in the art will appreciate that these serial communication techniques minimize the number of the opto-couplers for a system with multiple channels.

PSDs 320 can use hermetic components and packaging for extreme environmental conditions or can use plastic packages for commercial applications. The PSDs 320 use power MOSFET technology to minimize power dissipation from the power switching devices and provide both AC and DC capabilities. Each PSD contains at least one transistor/switching device (not shown), a sense resistor (shunt) 322 and a temperature sensor, 324. Each ASIC 330 includes a thermal shut-down circuit 336, as shown in FIG. 3B, that opens the corresponding power switching device when the substrate of the power switching device exceeds a predetermined reference temperature, as detected by temperature sensor 324. The predetermined reference temperature can be adjusted using an external setting resistor (not shown). Since the operation of the ELMC relies heavily on the integrity of the PSDs 320, the junction temperature of each PSD 320 should be maintained in its safe operating area. To achieve this a careful selection of the amount of silicon and optimization of the thermal path for the power semiconductors was undertaken. The LMM 310 design provides for adequate cooling and incorporates a thermal shut down protective feature for the PSDs 320 via the associated ASICs 330, as described above.

In another embodiment, the wire bonds in the individual MOSFET transistors are designed to act as a fusible link in series with the transistor. One of the inherent weaknesses in MOSFET transistors is a short circuit that forms between the drain and source when the device fails. In a power switching and protection device this failure mode can be catastrophic for the protected (e.g., load, wiring, etc.) devices. Therefore, designing the wire bonds to act as fusible links can mitigate the damage to the protected devices. Applying similar design rules as used in designing a fuse (e.g., $I^2t$ calculated under the safe operating area of the protected wiring), the MOSFET wire bonds can be designed to provide a delayed fuse for the nominal current rating of the SSSD (e.g., a fourteen amp fuse for a ten amp nominal rated device). Those skilled in the art will appreciate that the specific design criteria is dependent on a number of factors such as wire bond material, anticipated ambient and operating temperatures, and the like. Additionally, since MOSFETs are good current sharing devices when connected in parallel, paralleling the fusible links will also apply to the design considerations.

Figure 4:
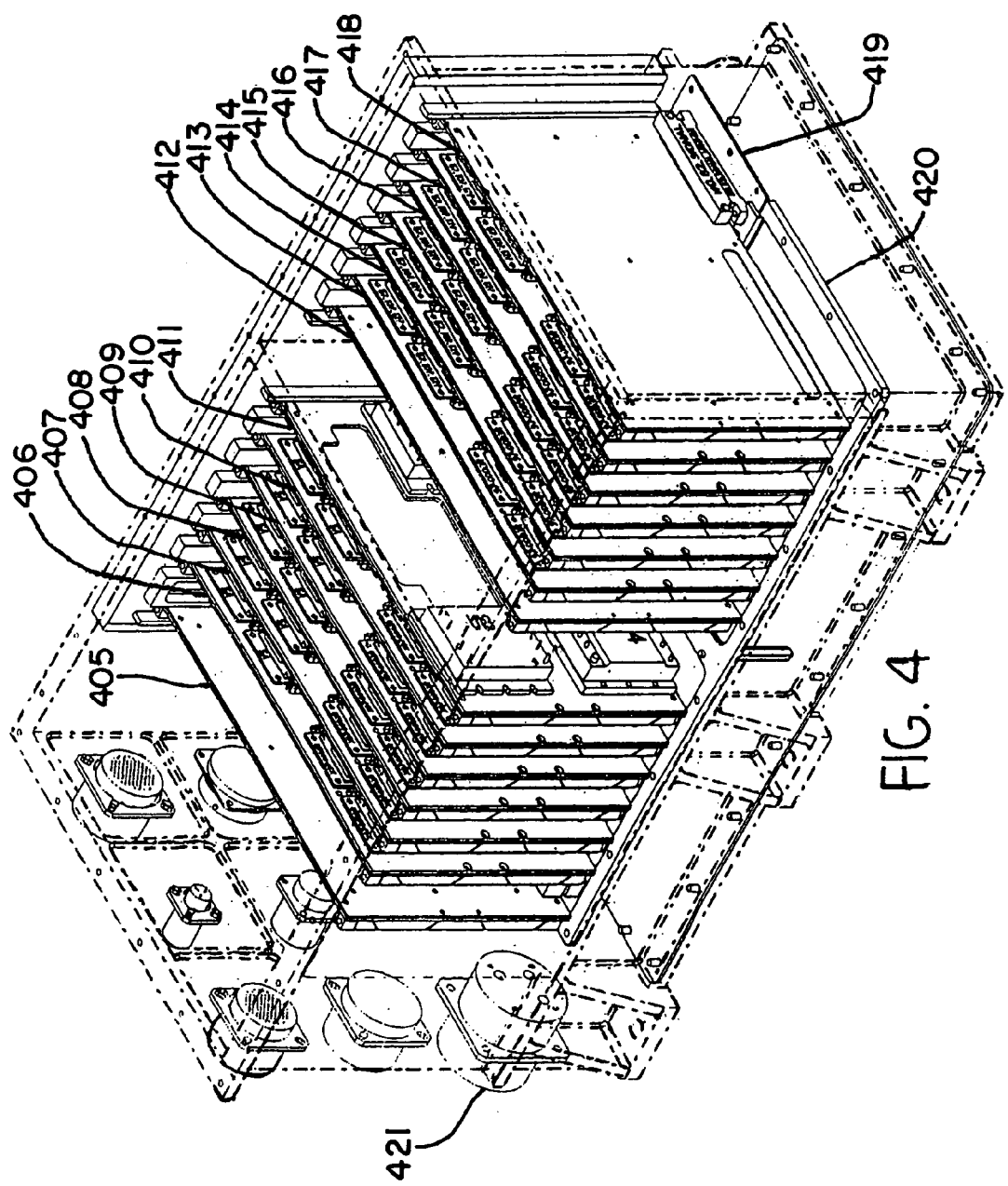
FIG. 4 illustrates packaging of the ELMC in accordance with an aspect of the present invention.

ELMC packaging can be implemented as in FIG. 4. In this particular case the ELMC contains a relay LMM card 405, five AC SSSD LMMs 406 to 410, one power supply card 411, one Electronic Load Contactor Unit (ELCU) card 412, five DC SSSD LMMs 413 to 417 and a gateway card 418. The relay card is built in a similar way as the SSSD LMM. It contains a plurality of 2 pole double throw (PDT) switches for one phase AC or DC applications, 4PDT switches for AC three phase applications and associated relay drivers controlled by the local microcontroller. Associated monitoring circuitry is provided as required. An ELCU card is provided to control a plurality of electromechanical contactors outside ELMC. The ELCU card is built similar to the SSSD LMM. The SSSD is used as contactor coil driver. The ASIC monitors the current conducted through contactor's poles and associated monitoring in a similar fashion as described above. The circular connectors 421 on the front of the chassis are the electrical interfaces with the host vehicle. The internal communication, signal conditioning and internal power supplies to the LMMs are handled by a motherboard card 419 on the bottom half of the chassis. All power lines and distribution lines are wired on the other half of the bottom using a backplane 420.

As previously discussed, each LMM includes an embedded microcontroller to control and monitor a number of the SSSDs. The LMM can work as a stand-alone module communicating with other subsystem processors via a serial data bus or can communicate with the gateway module card via the serial data bus that extends along the motherboard 419. Those skilled in the art will appreciate that the individual LMM system architecture is designed to accommodate the capability of making local decisions based on a limited number of inputs available.

Figure 5:
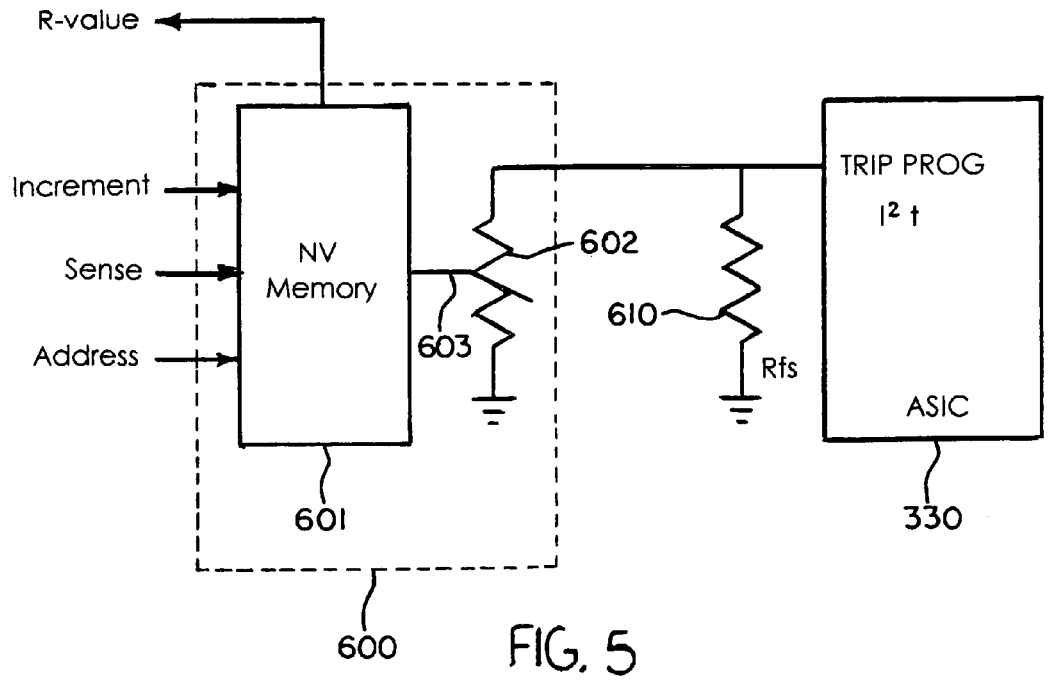
FIG. 5 illustrates a programmable trip function in accordance with an aspect of the present invention.

FIG. 5 illustrates a programmable aspect of the trip function of the ASIC 330. Since the SSPC of the LMMs are typically designed for discrete power ranges (e.g., 5, 15 and 25 amps), it is desired to have a way to program the ASIC to trip at level in between the discrete power ranges. For example, a 25 amp system could be supplied for a load that only required 20 amps. Accordingly, the trip conditions should be adjusted to reflect the 20 amp requirement and not the full 25 amps of the module. Therefore, a digitally controlled potentiometer 600 is provided to interface with the previously described ASIC 330 to adjust the $I^2t$ characteristic and instantaneous trip function.

The digitally controlled potentiometer 600 comprises a nonvolatile memory 601 and a programmable potentiometer 602. Those skilled in the art will appreciate that this a simplified version of the digital potentiometer 600 and that such devices and equivalent variable resistors are commercially available. Accordingly, the invention is not limited to this specific device, but could utilize any device that provided for a similar function. In this example, the position of the wiper 603 is stored in nonvolatile memory 601, which is recalled upon every subsequent power-up operation. The component selection (i.e., Address of the digital potentiometer that corresponds to the ASIC that is to be programmed), direction of the wiper movement (Sense) and number of increments (Increment) are sent from the local microcontroller via opto-couplers to preserve galvanic isolation of the low voltage side components. The resistance value (R-value) of the programmable potentiometer 601 is provided as feedback to the microcontroller from the digital potentiometer 600. Those skilled in the art will appreciate that the communication (e.g., R-value, Sense, Increment, Address) between the digital potentiometer 600 and the local microcontroller/VMC can be performed using the serial addressing, decoding and encoding techniques previously described to reduce the number of independent communication lines that need to be isolated. Alternatively, these communications can be performed using independent lines, or combinations of these techniques as best fits the system design parameters (e.g., number of channels, data communicated, number of opto-couplers available, circuit board size, and the like)

By varying the resistance value of programmable potentiometer 601 that is connected to the TRIP_PROG input of the ASIC 330, an amplifier gain can be programmed by the digital potentiometer 600, in order to scale the current reading to a corresponding rating of the trip curve). Additionally, fail-safe resistor 610 can be provided to prevent an open circuit condition from occurring should the digital potentiometer 600 fail. For example, the fail-safe resistor 610 can correspond to the minimum current rating the PSD associated with ASIC 330. By programming the over current protection characteristic of the ASIC with an external digital potentiometer 600, the processing load on the ASIC is reduced as is the communications requirements between the ASIC and the microcontroller. Further, since the digital potentiometer has a nonvolatile memory that stores the set value, the trip position can be set once and not reprogrammed until it is required by a changed condition. Accordingly, the system does not have to reload the device trip parameters after every power-up/reset sequence as is required in prior art systems.

Figure 6:
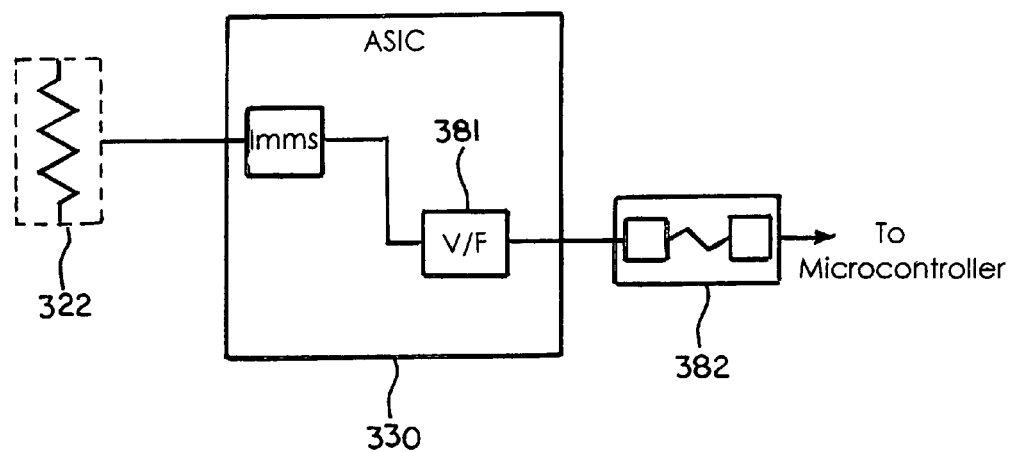
FIG. 6 illustrates a current reporting function in accordance with an aspect of the present invention.

Referring to FIG. 6, a block diagram of current reporting function of the present invention is shown. The current is detected from the shunt resistor 322 inside the PSD and is processed by ASIC 330 to produce a true RMS current value, as previously described. The true RMS current value is used for the $I^2t$ calculations. Additionally, this true RMS current value is converted in voltage to frequency converter 381 to a frequency. The frequency output is passed through opto-coupler 382 to isolate the low voltage and high voltage components, thereby maintaining the galvanic isolation between the ASIC and local microcontroller. The isolated frequency is provided to the microcontroller to provide the true RMS current value to the microcontroller. A basic accumulator can be used to convert the frequency input into a digital value representing the true RMS current value. However, those skilled in the art will appreciate other methods for converting the frequency signal into a digital value exist and could be used to supply the RMS current value to the microcontroller.

Further, the LMM's can be interfaced to additional devices, logic and the like, by interfacing to the local microcontroller 310. The local microcontroller 310 can be interfaced with via analog and discrete signals 4 at the embedded analog to digital converters and logic I/O, via interrupt (IRQ) ports, and via the serial communication buses 2, 3. For example, a ground fault interrupter (GFI) function can be interfaced to the local microcontroller 310 to further protect personnel and equipment (by switching off the associated PSD). Additionally, an Arc Fault Detection (AFD) function can be used to protect wiring in aircraft or other vehicle. Logic functions processed outside the distribution system can be interfaced to the local microcontroller 310 in the same manner. For example, a fan needs to be turned off 60 seconds delay after the temperature reaches a low threshold or the power needs to be switched off if two discrete signals are both at high logic levels. These types of logic functions are easily performed in the local microcontroller. Therefore, some of the relay logic otherwise needed to control these operations can be eliminated by providing these signals to the local microcontroller via input through the external discrete and analog input signals 4. Those skilled in the art will appreciate that commercially available microcontrollers such as the Motorola 68HC912 series have integrated analog and digital input capability that allow for the above-described operations. Therefore, details of the interface will not be further described herein.

The foregoing merely illustrates the principles of the invention. It will be appreciated that those skilled in the art will be able to devise various arrangements, which, although not explicitly described or shown herein, embody the spirit and scope of the present invention. For example, each component described can be used as a complete unit (e.g., LRU) or as a module (e.g., a line replaceable module LRM). In addition, the ASIC, combined with the PSD and associated electronics can be packaged in hybrid case to provide a single solid state power controller function. Therefore, the scope of the invention is not limited by the foregoing description but is defined solely by the appended claims.

What is claimed is:

1. An electrical power distribution center comprising:
   a gateway module including logic to interface to a vehicle management computer (VMC) via a dual redundant standard data bus, wherein the gateway module comprises redundant microcontrollers operably connected to the VMC for selectively controlling supply of electrical power to a plurality of separate electrical loads;
   two internal serial data buses, wherein the two internal serial data buses are of two different types and the redundant microcontrollers are each operably connected to the two internal serial data buses; and
   a plurality of Load Management Modules (LMMs), each Load Management Module operably connected to the internal serial data buses for receiving control commands from the gateway module, wherein each Load Management Module comprises:
   a local microcontroller;
   a plurality of power switching devices; and
   a plurality of application specific integrated circuits (ASICs) corresponding to the plurality of power switching devices for interfacing the power switching devices to the local microcontroller, wherein each ASIC is connected to a corresponding digital potentiometer that is used to program an over current protection characteristic of the ASIC.

2. The electrical power distribution center according to claim 1, wherein each ASIC is configurable for both AC and DC loads at a plurality of current ratings.

3. The electrical power distribution center according to claim 1, wherein the over current protection characteristic is an integration parameter of an $I^2t$ curve which set by a resistance value of the digital potentiometer.

4. The electrical power distribution center according to claim 3, wherein each ASIC includes an analog signal processing block that conditions a load current sense voltage across a sense resistor to produce a true RMS current value.

5. The electrical power distribution center according to claim 4, wherein the true RMS current value is used for calculating an $I^2t$ value.

6. The electrical power distribution center according to claim 5, wherein each ASIC includes an analog processor that uses the $I^2t$ value and the resistance value of the digital potentiometer to determine trip times for corresponding power switching devices.

7. The electrical power distribution center according to claim 1, wherein the digital potentiometer comprises a non-volatile memory and a programmable potentiometer.

8. The electrical power distribution center according to claim 7, wherein a resistance value of the programmable potentiometer is maintained during power interruptions.

9. The electrical power distribution center according to claim 1, further comprising a fail-safe resistor connected in parallel with the digital potentiometer.

10. The electrical power distribution center according to claim 9, wherein the fail-safe resistor is set to the maximum rated current of the corresponding power switching device.

* * * * *